UNITED STATES PATENT OFFICE.

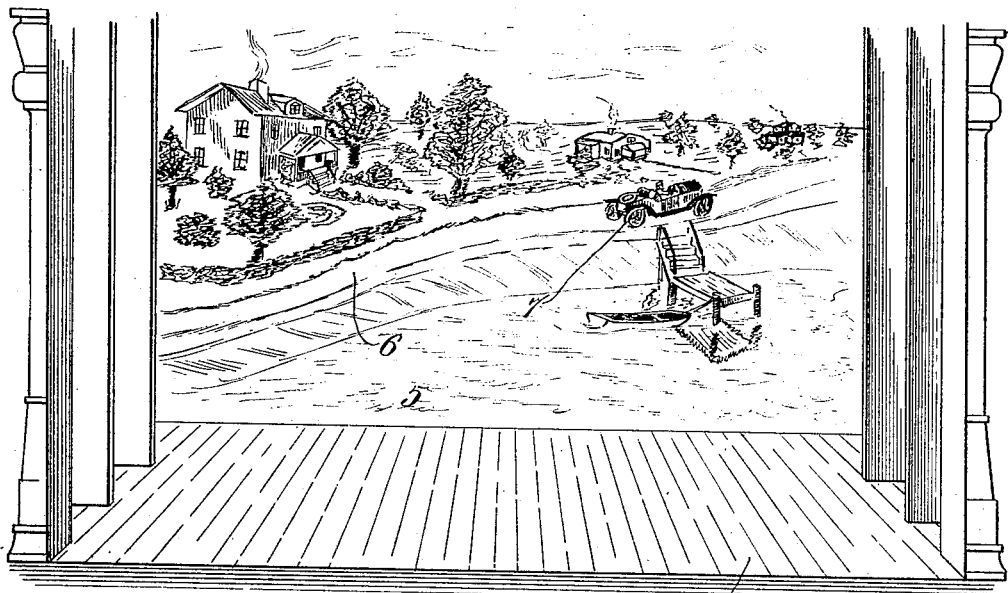
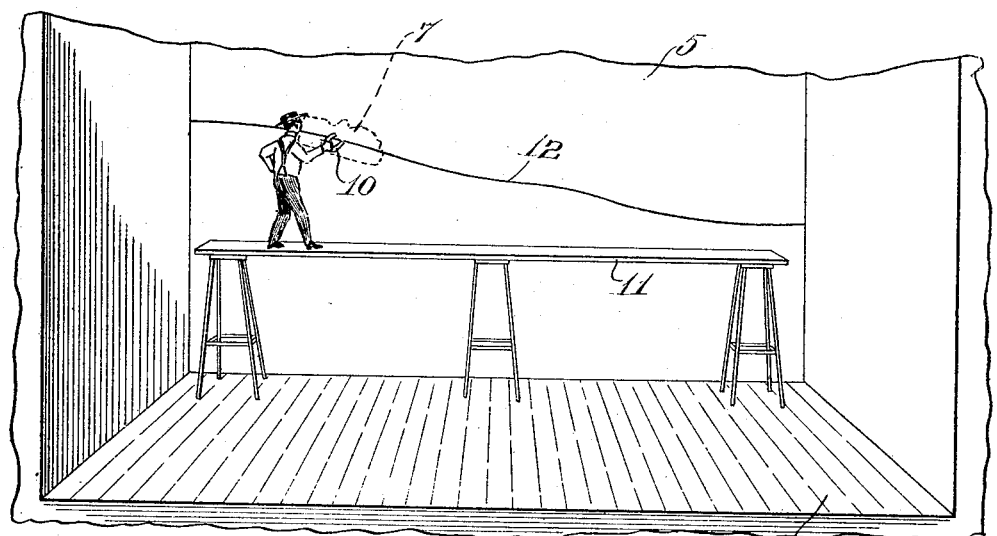

GUTHRIE Y. BARBER, OF CHICAGO, ILLINOIS.

SCENINC APPLIANCE.

1,123,066. Specification of Letters Patent. Patented Dec. 29, 1914.

Application filed December 30, 1912. Serial No. 739,385.

*To all whom it may concern:*

Be it known that I, GUTHRIE Y. BARBER, a subject of the King of England, residing at Chicago, in the county of Cook and State of Illinois, have invented certain new and useful Improvements in Scenic Appliances, of which the following is a specification.

The present invention relates to appliances more particularly intended and adapted for use in connection with stage scenery.

The objects of the present invention are to provide a device or appliance for moving a disconnected object or objects across the surface of inanimate scenery thereby lending to said scenery animation in the form of an object moving across the same.

A further object of the invention is to produce this result without the use of any complicated or involved machinery or devices and to utilize a means for giving movement to the object which will move the same in any desired path of travel across the scenery.

A further object of the invention is to bring about such movement or animation without any direct connection or contact between the object and the means for moving the same, dispensing with supports, cords, wires, etc., which destroy the effect of the illusion.

The invention further consists in the production of a cheap and simple appliance for such purposes and in the provision of means for guiding the operator in confining the object in a definite line of travel across the scenery.

The invention further consists in the features of construction and combination of parts hereinafter described and claimed.

In the drawings: Figure 1 is a perspective of a stage provided with a scene and showing an object thereon in the act of being moved there across. Fig. 2 a back view of such scenery showing the operator in the act of moving said object and showing a means for enabling the operator to guide the object in a definite line of travel, and Fig. 3 an edge view of the object.

The present invention relates as above stated to a means or appliance for moving an object across inanimate scenery, thereby imparting a movable scenery effect to the same. It is frequently desirable in producing stage effects to move an object or objects across a portion of the scenery, as for instance the back drop. Various means and devices have been used for moving objects in this manner, but have not, so far as I am aware, been found satisfactory owing to the difficulty of conveying an object across the vertical surface of the scenery, the usual means now employed is to move the object along the stage and in front of the scenery, but this does not always give the effect desired. The difficulty with moving disconnected objects has existed mainly through inability to maintain the object in engagement with the vertical surface of the scenery, it being understood that said scenery usually consists of an elongated vertically extending piece of canvas, and it has been found a matter of impossiblity, so far as I am aware, to propel or move an unattached object across such a surface. When I use the term disconnected I mean objects which are not suspended by cords, etc., or connected to supports of one sort or another, as for instance rollers or guides to enable the same to travel across the stage.

The present invention deals with a device or appliance for propelling a disconnected object across the surface of a scene in a manner so that no direct connection is had between the propelling means and the object. Referring now to the drawing and particularly to Fig. 1 a stage 4 is illustrated which is supplied with a scenic back drop 5.

The scene illustrated embodies a roadway 6 and it is the desire to move certain objects across the scene following the path defined by the roadway. In the illustration of the invention the object which is moved is in the form of an automobile 7. It is understood, however, that the nature of the scene and the nature of the object may be varied as desired, and that more than one object may be set in motion at the same time if desired, either traveling in a common direction or in different directions.

The object in the form illustrated is painted or otherwise produced upon a surface 8, formed of card board or other suitable material and on the back of this surface 8 is a metal plate 9 capable of magnetic attraction. If desired the object itself may be painted or otherwise formed on a metal plate thus making the object of one piece insead of two pieces. In fact the particular method of making the object is immaterial so long as it is capable of magnetic attraction. The means which I employ for propelling the object across the scene consists of a magnet 10 which preferably is of a nature to be held in the hand of the operator and the magnetic influence of said magnet will so attract the object as to compel the object to move in correspondence with the movement of the magnet.

Referring to Fig. 2 it will be seen that as the operator moves across the scaffold or platform 11 carrying the magnet with him the object will move in accordance with the movement of the magnet and the object will thus be propelled across the surface of the scene by magnetic attraction, eliminating any visible positive connection of any kind with the object, thus eliminating any cords, supports, etc., by which the object is suspended. Of course the object can be brought to rest if desired by the operator halting his movement, or it can be moved at various speeds by the operator moving in accordance with the desired movement of the object.

No special or complicated appliances are needed to move the object in the manner above stated the difficulty of installation and operation are negligible, the object itself is cheap and simple of manufacture enabling a wide range of subjects to be embraced. The effect of perspective can be easily carried out in the present invention by rendering the objects of a size and nature to conform to the perspective desired. It is desirable in most cases to have the object maintain a course of movement across the scene which will be confined within certain bounds and in order to assist the operator in maintaining it within said bounds, a line 12 may be drawn across the back of the scenery so that by following this line the object may be propelled in the proper path to maintain it within the bounds desired. In some cases the guiding line may not be necessary, as for instance in cases where no positive bounds within which the object must be moved are necessary, or in cases where the operator is enabled by the lights in front of the scenery to see through the same and thus govern movement of the objects in accordance with the view obtained.

I claim:

1. In combination with scenery of the class described, a member disconnected therefrom and capable of magnetic attraction and of a character to supply a movable scenic feature, and means for holding said member directly against the outer vertical flat surface of said scenery and moving the same thereacross, and on any selected portion of the said surface, said means comprising a movable magnet on the reverse side of said scenery, whereby a moving object may be supplied to said scenery conforming in size and nature to that portion of the scene with which it is associated, substantially as described.

2. In combination with scenery of the class described, a member disconnected therefrom and capable of magnetic attraction and of a character to supply a movable scenic feature, means for holding said member directly against the outer vertical flat surface of said scenery and moving the same thereacross on any selected portion of the surface thereof, said means consisting of a manually controlled magnet on the reverse side of said scenery, whereby a moving object may be supplied to said scenery conforming in size and nature to that portion of the scenery with which it is associated, and a guide line on the reverse side of said scenery indicating the desired path of movement of the object across the scenery, substantially as described.

GUTHRIE Y. BARBER.

Witnesses:
SAMUEL W. BANNING,
WM. P. BOND.

Copies of this patent may be obtained for five cents each, by addressing the "Commissioner of Patents, Washington, D. C."